US008411803B2

United States Patent
Chuang

(10) Patent No.: US 8,411,803 B2
(45) Date of Patent: Apr. 2, 2013

(54) METHOD AND APPARATUS FOR MODULATION RECOGNITION IN COMMUNICATION SYSTEM

(75) Inventor: Yuan-Shin Chuang, Kaohsiung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 297 days.

(21) Appl. No.: 12/862,769

(22) Filed: Aug. 25, 2010

(65) Prior Publication Data

US 2011/0261906 A1    Oct. 27, 2011

(30) Foreign Application Priority Data

Apr. 22, 2010 (TW) .............................. 99112682 A

(51) Int. Cl.
*H04L 27/06* (2006.01)

(52) U.S. Cl. ........ 375/340; 375/316; 375/262; 375/341; 375/343; 375/219

(58) Field of Classification Search ................. 375/340, 375/316, 262, 341, 343, 219
See application file for complete search history.

(56) References Cited

U.S. PATENT DOCUMENTS

| | | | | |
|---|---|---|---|---|
| 5,369,500 A * | 11/1994 | Jacobs | ........................... | 358/406 |
| 6,298,092 B1 * | 10/2001 | Heath et al. | .................... | 375/267 |
| 6,614,851 B1 * | 9/2003 | Dehghan et al. | .............. | 375/261 |
| 6,879,626 B1 * | 4/2005 | Sudo | .............................. | 375/219 |
| 6,952,458 B1 * | 10/2005 | Djokovich et al. | ........... | 375/341 |
| 7,142,610 B1 * | 11/2006 | Wang | ............................. | 375/262 |
| 7,180,962 B2 * | 2/2007 | Chang et al. | ................... | 375/316 |
| 7,583,747 B1 * | 9/2009 | Damen et al. | ................... | 375/267 |
| 7,773,682 B2 * | 8/2010 | Hayashi et al. | ............... | 375/260 |
| 8,155,245 B2 * | 4/2012 | Tsuruta et al. | ................ | 375/340 |
| 2007/0165729 A1 * | 7/2007 | Ha et al. | ......................... | 375/260 |
| 2009/0207950 A1 * | 8/2009 | Tsuruta et al. | ................ | 375/343 |
| 2011/0211549 A1 * | 9/2011 | Au et al. | ........................ | 370/329 |

* cited by examiner

*Primary Examiner* — Kenneth Lam
(74) *Attorney, Agent, or Firm* — Jianq Chyun IP Office

(57) ABSTRACT

A method and an apparatus for modulation recognition in communication system are provided. First, a plurality of constellation corresponding different modulation types are provided, wherein each constellation has a plurality of points. An input signal is de-mapped to find out a nearest point located nearest to a position of the input signal in each constellation. The distances from the nearest points to the position of the input signal are respectively counted to obtain a plurality of distance statistics values corresponding to different modulation types. The apparatus compares the distance statistics values for recognizing the modulation type of the input signal.

3 Claims, 8 Drawing Sheets

METHOD AND APPARATUS FOR MODULATION RECOGNITION IN COMMUNICATION SYSTEM

CROSS-REFERENCE TO RELATED APPLICATION

This application claims the priority benefit of Taiwan application serial no. 99112682, filed on Apr. 22, 2010. The entirety of the above-mentioned patent application is hereby incorporated by reference herein and made a part of specification.

BACKGROUND OF THE INVENTION

1. Field of the Invention

The invention relates to a communication system. More particularly, the invention relates to a method and an apparatus for modulation recognition in a communication system.

2. Description of Related Art

A plurality of different modulation techniques can be applied in a communication system (for example, a digital video broadcasting-cable (DVB-C) system), so that a receiving end of the communication system must be able to correctly recognize a modulation type. Generally, modulation recognition algorithms can be divided into two main types such as pattern recognition and maximum likelihood (ML) recognition. The pattern recognition is to obtain high-order statistics data or an envelop of a signal, so as to present characteristics of different modulation signals. However, implementation of the pattern recognition is complicated. Moreover, in a noisy environment, performance of the pattern recognition is decreased. The ML recognition is performed under a premise of maximum likelihood or log likelihood. In the noisy environment, a low convergence rate of the ML recognition requires to receive a large amount of monitoring samples of data.

SUMMARY OF THE INVENTION

The invention is directed to a method and an apparatus for modulation recognition in a communication system, by which a modulation type of an input signal can be correctly and quickly recognized.

The invention provides a method for modulation recognition in a communication system. The method can be described as follows. A plurality of constellations corresponding to a plurality of modulation types are provided, wherein each constellation has a plurality of points. An input signal is de-mapped to respectively find out a nearest point located nearest to a position of the input signal in each of the constellations. A distance between the nearest point and the position of the input signal in each of the constellations is counted to obtain a plurality of distance statistics values corresponding to the modulation types. The distance statistics values are compared to recognize the modulation type of the input signal.

The invention provides a modulation recognition apparatus in a communication system, which includes a first multiplication unit, a de-mapping unit, a statistics unit and a decision unit. The first multiplication unit calculates a square of an absolute value of an input signal. The de-mapping unit is coupled to the first multiplication unit. The de-mapping unit respectively finds out a nearest point located nearest to a position of the input signal in a plurality of constellations according to an output of the first multiplication unit, wherein the constellations correspond to a plurality of modulation types. The statistics unit is coupled to the de-mapping unit. The statistics unit respectively counts distances between the nearest points and the position of the input signal to obtain a plurality of distance statistics values corresponding to the modulation types. The decision unit is coupled to the statistics unit. The decision unit compares the distance statistics values to recognize the modulation type of the input signal.

In an embodiment of the invention, a method of counting the distance between the nearest point and the position of the input signal is as follows. The signal distance is normalized to provide a point space between the nearest point and a neighboring point (the position of the input signal is located between the nearest point and the neighboring point), and the signal distance is divided by the point space. Then, the normalized signal distance is counted to obtain the distance statistics values corresponding to the modulation types.

As described above, in the invention, according to different constellation point characteristics of different modulation types, the nearest points of the input signal in the constellations corresponding to various modulation types are respectively de-mapped, and the distances (differences) between the nearest points and the position of the input signal in the constellations are respectively counted. The modulation recognition apparatus respectively counts the distances between the nearest points and the position of the input signal in the constellations to obtain a plurality of distance statistics values corresponding to the modulation types. By comparing the distance statistics values, the modulation recognition apparatus can quickly and correctly recognize the modulation type of the input signal. Therefore, the modulation recognition apparatus can recognize the modulation type of the input signal without requiring a transmitting end to provide any priority information. The modulation recognition method of the invention is not influenced by carrier and phase offset, and has advantages of low complexity and high convergence rate. In a noisy environment, the modulation recognition method and the modulation recognition apparatus of the invention still have a good performance.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A general communication system can use various modulation types. For example, a digital video broadcasting-cable (DVB-C) system can use various quadrature amplitude modulations (QAMs). The QAMs used by the DVB-C system include 16QAM, 32QAM, 64QAM, 127QAM and/or 256QAM. However, a receiving end of the DVB-C system generally receives no priority information of the modulation types used by a transmitting end. Therefore, modulation recognition is required to be executed at the receiving end, so as to detect the modulation type used for transmission.

Figure 1:
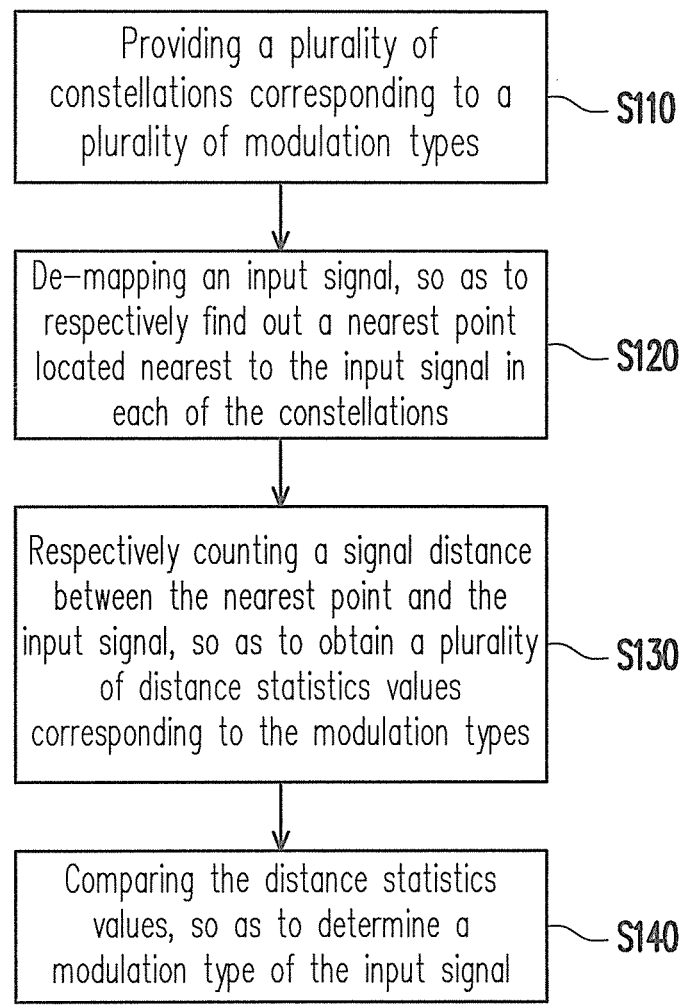
FIG. 1 is a flowchart illustrating a method for modulation recognition in a communication system according to an embodiment of the invention.
Figure 2:
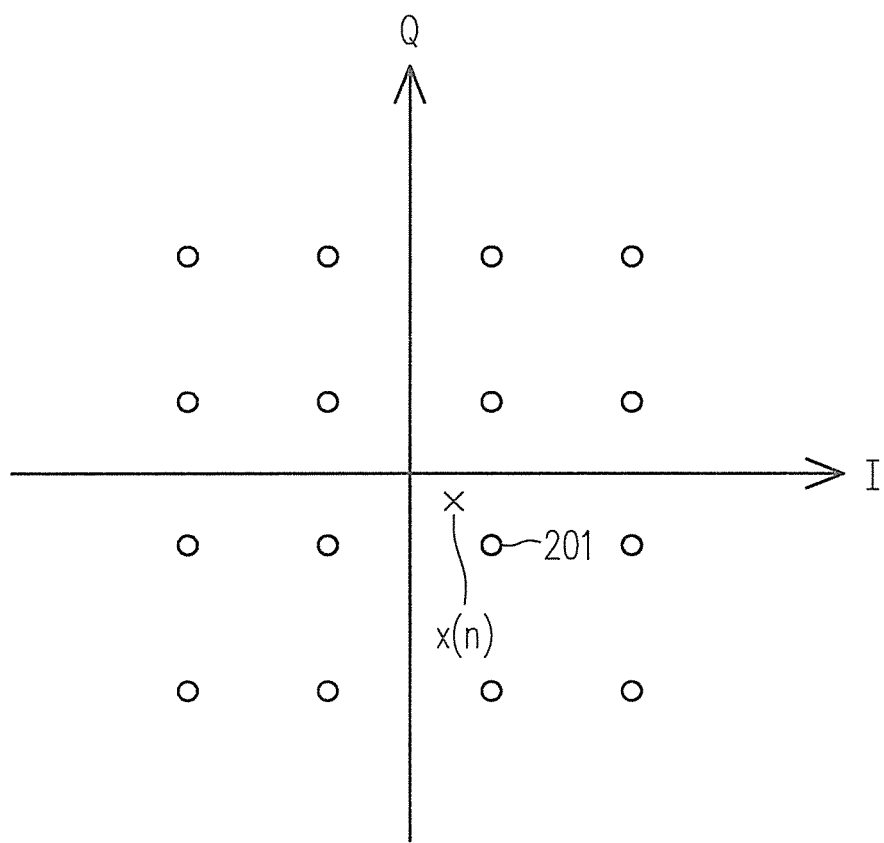
FIG. 2 is diagram illustrating a general 16 quadrature amplitude modulation (QAM) constellation.

FIG. 1 is a flowchart illustrating a method for modulation recognition in a communication system according to an embodiment of the invention. In step S110, a plurality of constellations is provided, wherein the constellations correspond to a plurality of modulation types, and each constellation has a plurality of points. In the present embodiment, the modulation type of the 16QAM is taken as an example, and constellations of the other modulation types (for example, the 32QAM, the 64QAM, the 128QAM and/or the 256QAM) can be deduced by analogy. FIG. 2 is diagram illustrating a general 16QAM constellation. Wherein, a longitudinal coordinate represents a quadrature component Q, and a horizontal coordinate represents an in-phase component I. The 16QAM constellation shown in FIG. 2 has a plurality of points (for example, a point 201). "x" represents a position of an input signal x(n) in the 16QAM constellation at a time point n. If the input signal x(n) applies the modulation type of 16QAM, multiple input signals x(n) are gathered at 16 points (for example, the point 201) shown in FIG. 2.

In step S120, a modulation recognition apparatus de-maps the input signal x(n) to find out a nearest point located nearest to a position of the input signal x(n) in each of the constellations representing different modulation types. For example, the modulation recognition apparatus can find the nearest point 201 in the 16QAM constellation of FIG. 2, and a distance between the nearest point 201 and the position of the input signal x(n) is the shortest. Deduced by analogy, the modulation recognition apparatus can respectively find nearest points in the constellations of the other modulation types (for example, the 32QAM, the 64QAM, the 128QAM and/or the 256QAM).

Next, in step S130, the modulation recognition apparatus respectively counts signal distances between the nearest points and the position of the input signal x(n) in the constellations. After a time period, the modulation recognition apparatus can count the signal distances in different constellations to obtain a plurality of distance statistics values corresponding to different modulation types. Next, in step S140, the modulation recognition apparatus compares the distance statistics values to recognize the modulation type of the input signal x(n).

Taking the 16QAM constellation of FIG. 2 as an example, if the modulation type used by the input signal x(n) is not the 16QAM, the input signals x(n) are not gathered at the 16 points of FIG. 2. Therefore, the distance statistics values obtained by counting the signal distances in the 16QAM constellations through the modulation recognition apparatus can be very large.

If the input signals x(n) are gathered at the 16 points of FIG. 2, the distance statistics value obtained by counting the signal distance in the 16QAM constellation through the modulation recognition apparatus is very small (which is even close to 0). Therefore, the modulation recognition apparatus can determine that the 16QAM constellation with the minimum distance statistics value is the modulation type used by the input signal x(n), i.e. the modulation recognition apparatus recognizes that the input signal x(n) uses a modulation type of the 16QAM.

Figure 3A:
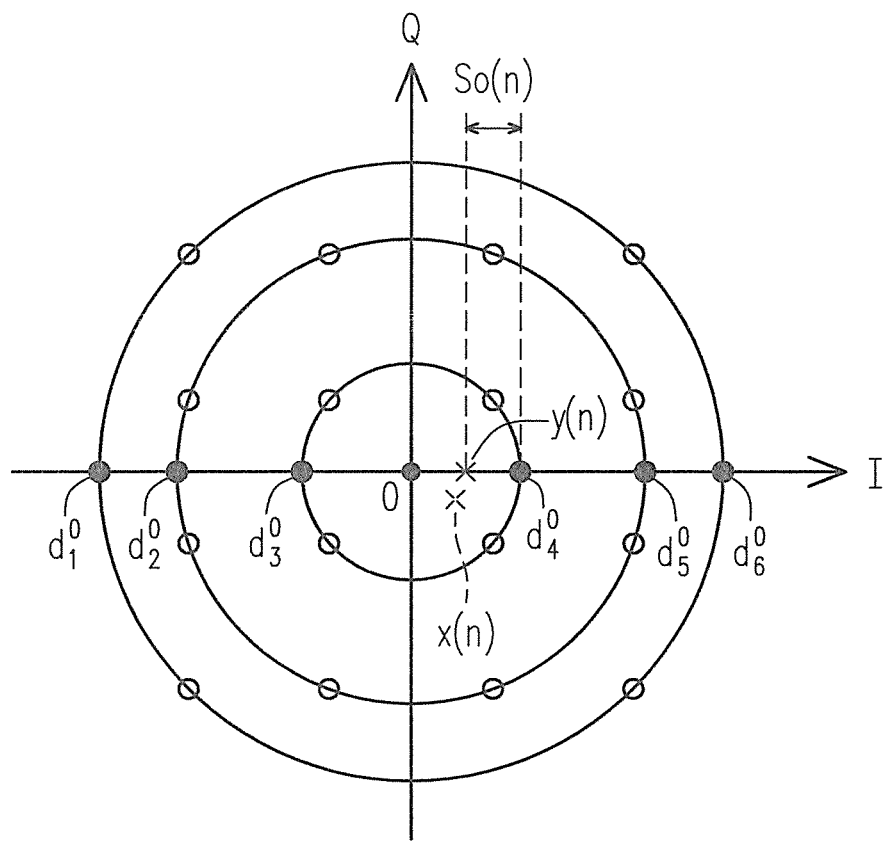
FIG. 3A is a schematic diagram illustrating points of a 16QAM constellation that are rotated to an I-axis according to an embodiment of the invention.

To simplify a calculation of the signal distance, the points and the input signal x(n) in the constellation can be converted onto an I-axis, so as to eliminate influences of carrier and phase offset. For example, an absolute value of the input signal x(n) (i.e. a distance between the input signal x(n) and a base point O) is obtained, which is equivalent to rotate the position of the input signal x(n) onto the I-axis to obtain an input signal y(n), i.e. $y(n)=|x(n)|$. Absolute values of the points (i.e. distances between the points and the base point O) on the constellation are also obtained, which are equivalent to rotate the points onto the I-axis while taking the base point O as a circle center, so as to obtain new points $d_{k_i}^i$, wherein i represents the modulation type, and $k_i$ represents a point number of an i-th modulation type. For example, FIG. 3A is a schematic diagram illustrating the points of the 16QAM constellation that are rotated to the I-axis. The points of the 16QAM constellation are rotated to the I-axis to obtain new points $d_1^0$, $d_2^0$, $d_3^0$, $d_4^0$, $d_5^0$ and $d_6^0$. Therefore, as long as a difference between the nearest point $d_4^0$ and the position of the input signal y(n) is calculated, the signal distance is obtained. The points $d_1^0$-$d_6^0$ can be calculated in advance to establish a look-up table, so as to reduce a circuit calculation complexity. The above description can be applied to the constellations of the other modulation types (for example, the 32QAM, the 64QAM, the 127QAM and/or the 256QAM).

Figure 3B:
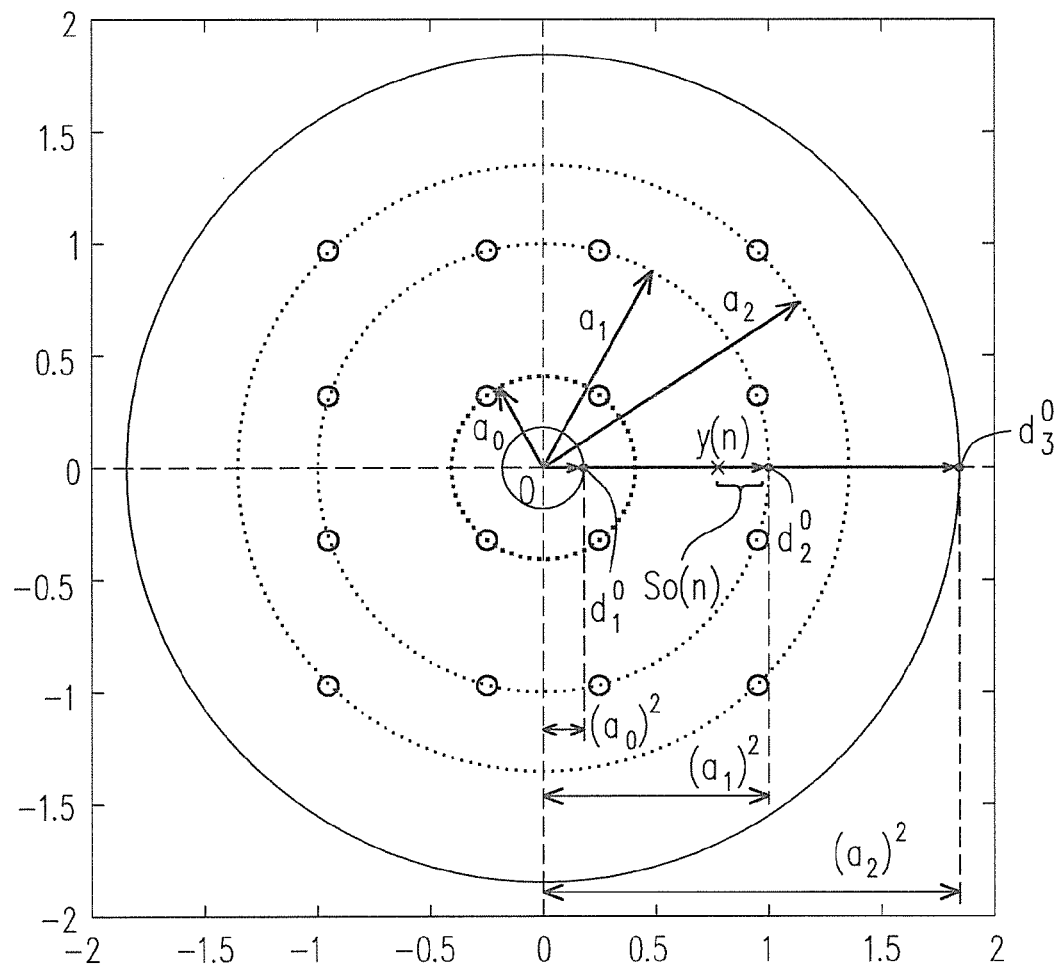
FIG. 3B is a schematic diagram illustrating a method of obtaining squares of absolute values of points of a 16QAM constellation according to an embodiment of the invention.

A method of simplifying the calculation of the signal distance is to perform square of absolute value operations to the points and the input signal x(n) of the constellation, which also has an effect of eliminating the influences of the carrier and phase offset. The square of absolute value operations can also be performed to the points in the constellations of various modulation types to obtain new points $d_{k_i}^i$, wherein i represents the modulation type, and $k_i$ represents a point number of an i-th modulation type. For example, FIG. 3B is a schematic diagram illustrating a method of obtaining squares of absolute values of the points of the 16QAM constellation according to an embodiment of the invention. As shown in FIG. 3B, the distances between the points and the base point O in the 16QAM constellation are respectively $a_0$, $a_1$ and $a_2$. The squares of absolute values of the points are performed to obtain new points $d_1^0$, $d_2^0$ and $d_3^0$, and the distances between the new points and the base point O are respectively $(a_0)^2$, $(a_1)^2$ and $(a_2)^2$. The square of absolute value of the input signal x(n) is performed to obtain an input signal y(n), i.e. $y(n)=|x(n)|^2$. In FIG. 3B, "x" represents a position of the input signal y(n) in the 16QAM constellation at a time point n after the square of absolute value is performed. Therefore, as long as a difference between the nearest point $d_2^0$ and the position of the input signal y(n) is calculated, the signal distance is obtained. It should be noticed that the points $d_1^0$~$d_3^0$ obtained after the squares of absolute values can also be calculated in advance to establish a look-up table, so as to reduce a circuit calculation complexity. The above description can be applied to the constellations of the other modulation types (for example, the 32QAM, the 64QAM, the 127QAM and the 256QAM). In the following embodiment, the input signal x(n) is converted into the input signal y(n) by using the square of absolute value operation.

Figure 4:
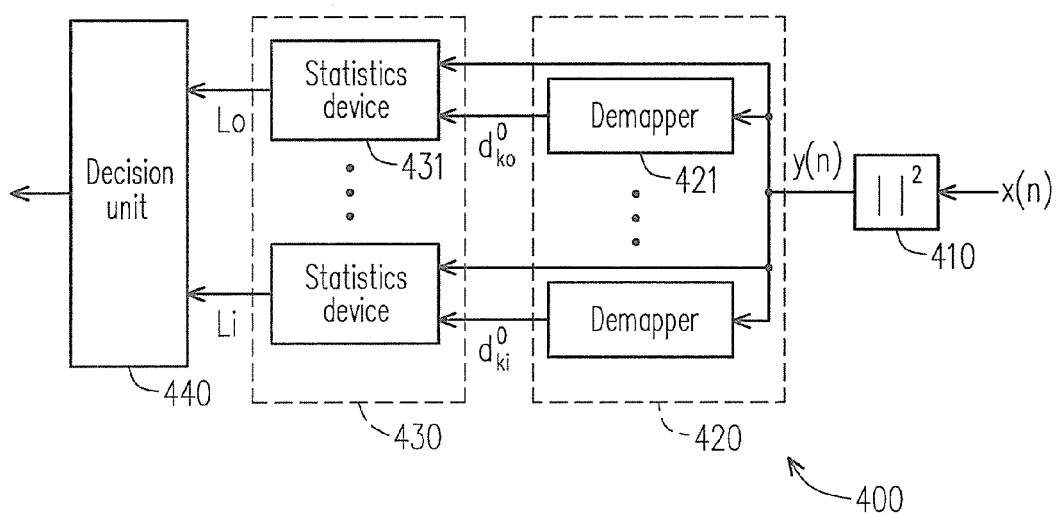
FIG. 4 is a schematic diagram illustrating a modulation recognition apparatus of a communication system according to an embodiment of the invention.

FIG. 4 is a schematic diagram illustrating a modulation recognition apparatus 400 of a communication system according to an embodiment of the invention. The modulation recognition apparatus 400 is used to execute the modulation recognition method of FIG. 1. The modulation recognition apparatus 400 includes a first multiplication unit 410, a de-mapping unit 420, a statistics unit 430 and a decision unit 440. The first multiplication unit 410 multiplies the absolute value of the input signal x(n) by the absolute value of the input signal x(n), i.e. squares the absolute value of the input signal x(n) to obtain the input signal y(n), so as to eliminate the influences of carrier and phase offset.

The de-mapping unit 420 is coupled to the first multiplication unit 410. The de-mapping unit 420 respectively finds out the nearest points $d_{k_i}^i$ located nearest to the position of the input signal y(n) in a plurality of the constellations according to the output input signal y(n) of the first multiplication unit 410. The de-mapping unit 420 includes a plurality of demappers 421. Each of the demappers 421 generates a hard decision $d_{k_i}^i$ of the output input signal y(n) of the first multiplication unit 410 for the statistics unit 430 according to a decision boundary $\Omega_i=\{d_1^i, d_2^i, \ldots, d_{K_i}^i\}$ corresponding to a modulation type, i.e. generates all of possible square value groups of the absolute values of the transmitted constellation points. Taking FIG. 3B as an example, the demapper 421 finds out the nearest point $d_2^0$ located nearest to the position of the input signal y(n) from $d_1^0$-$d_3^0$ of the 16QAM constellation with squared absolute values. The demapper 421 can be implemented by any approach according to a design requirement. For example, a look-up table can be used to implement the demapper 421.

The statistics unit 430 is coupled to the de-mapping unit 420. The statistics unit 430 respectively counts signal distances $S_i(n)$ between the nearest points $d_{k_i}^i$ and the position of the input signal y(n) of different constellations to obtain a plurality of distance statistics values $L_i$ corresponding to the modulation types. The statistics unit 430 includes a plurality of statistics devices 431. Each of the statistics devices 431 counts the signal distance $S_i(n)$ between the nearest point $d_{k_i}^i$ and the position of the input signal y(n) of a corresponding constellation, so as to obtain the distance statistics value of the corresponding constellation. Taking FIG. 3 as an example, the statistics device 431 counts the signal distance $S_0(n)$ between the nearest point $d_2^0$ and the position of the input signal y(n) in the 16QAM constellation with squared absolute values at a time point n, and counts the signal distances of the other time points. Then, the statistics device 431 counts N signal distances to obtain the distance statistics value $L_0$ corresponding to the modulation type of the 16QAM. A value of N can be determined according to an actual design requirement. The above description can be applied to the constellations of the other modulation types (for example, the 32QAM, the 64QAM, the 127QAM and the 256QAM).

The decision unit 440 is coupled to the statistics unit 430. The decision unit 440 receives and compares the distance statistics values $L_0$-$L_i$ corresponding to different modulation types, so as to recognize the modulation type of the input signal x(n). In the present embodiment, the decision unit 440 finds out a minimum value from the distance statistics values $L_0$-$L_i$, and recognizes the modulation type of the input signal x(n) according to the constellation that the found minimum distance statistics value is belonged. Taking FIG. 3B as an example, if the input signals x(n) are gathered at the 16 points of FIG. 3, the input signals y(n) are then gathered at the points $d_1^0$-$d_3^0$ on the I-axis. The distance statistics value $L_0$ obtained by counting the signal distance (for example, $S_0(n)$) in the 16QAM constellation with squared absolute values through the statistics unit 430 is very small (which is even close to 0). Therefore, the decision unit 440 determines that the minimum distance statistics value of the distance statistics values $L_0$-$L_i$ is $L_0$, and accordingly recognizes that the input signal x(n) uses a modulation type of the 16QAM.

Figure 5A:
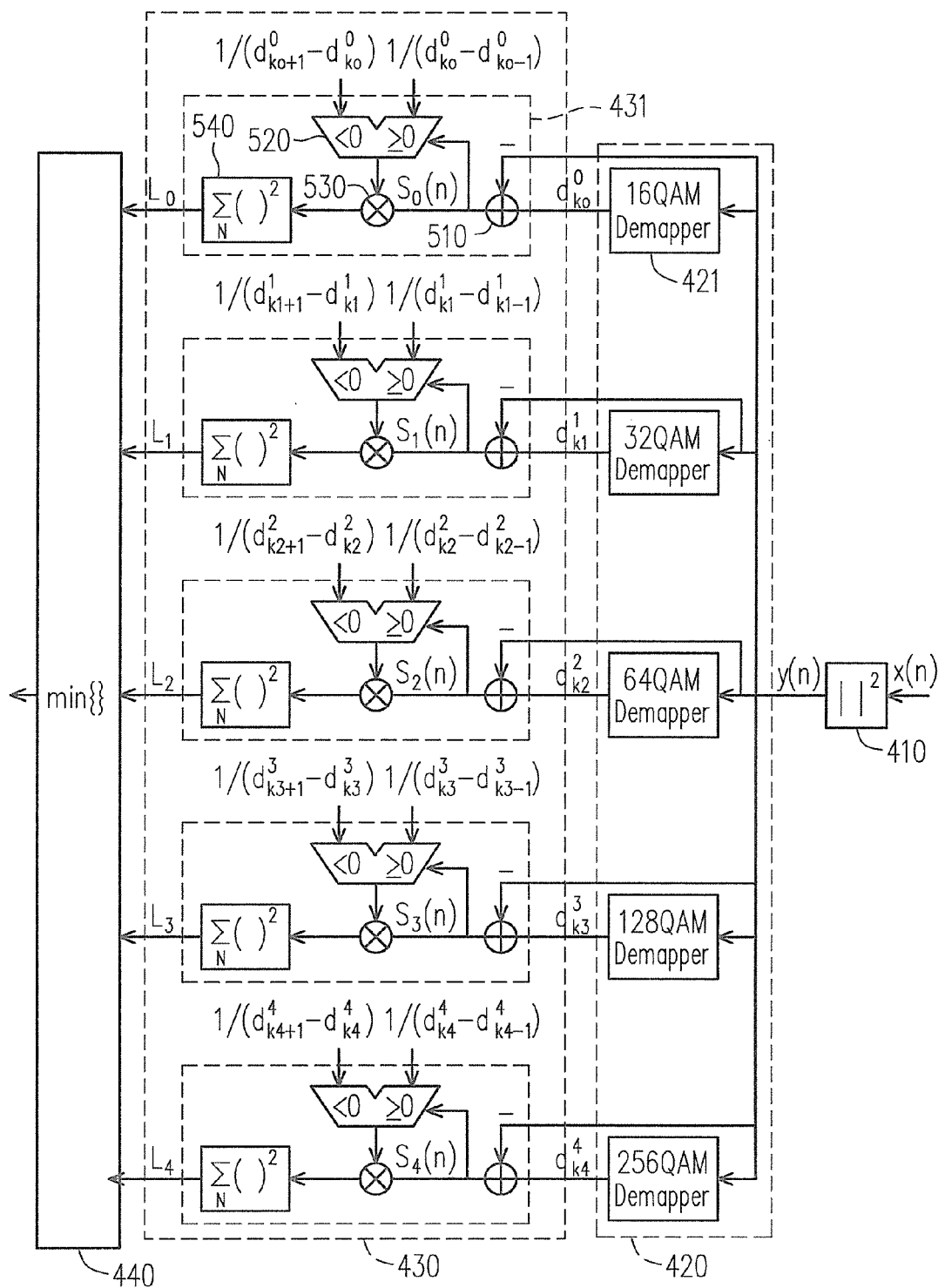
FIG. 5A is a diagram illustrating an example of a modulation recognition apparatus of FIG. 4 according to an embodiment of the invention.

The DVB-C system is taken as an example for the following descriptions. FIG. 5A is a diagram illustrating an example of the modulation recognition apparatus 400 of FIG. 4 according to an embodiment of the invention. In the present embodiment, based on different modulation types of 16QAM, 32QAM, 64QAM, 128QAM and 256QAM, the de-mapping unit 420 is configured with corresponding demappers (for example, the 16QAM demapper 421). Each of the demappers generates a hard decision $d_{k_i}^i$ of the input signal y(n) for the statistics unit 430 according to a corresponding decision boundary $\Omega_i=\{d_1^i, d_2^i, \ldots, d_{K_i}^i\}$. After the hard decision $d_{k_i}^i$ is generated, the input signal y(n) is subtracted from the hard decision $d_{k_i}^i$ to generate a signal $s_{k_i}^i$. The hard decision $d_{k_i}^i$ is equivalent to the nearest point of the input signal y(n).

Figure 5B:
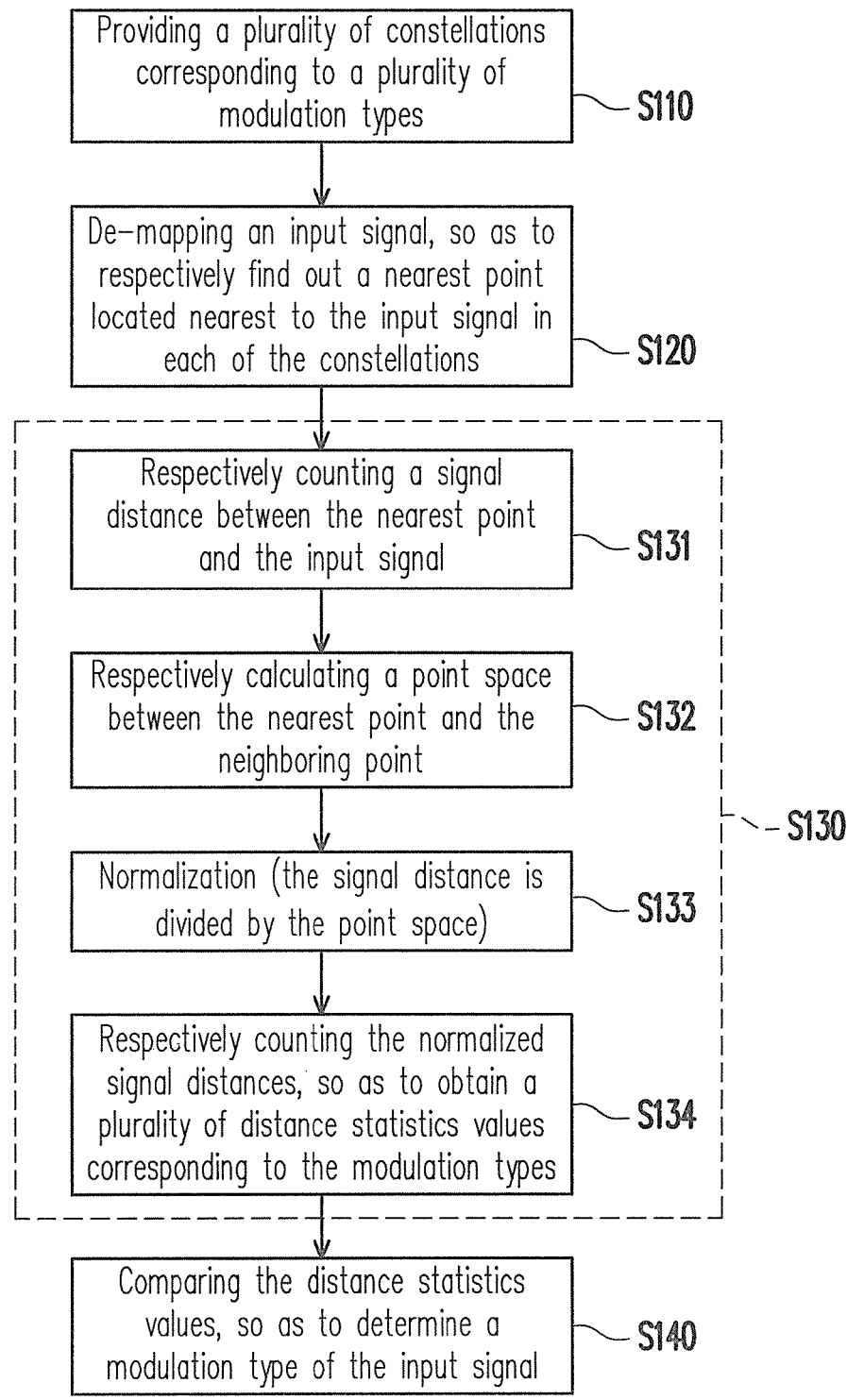
FIG. 5B is a flowchart illustrating implementation of a step S130 in FIG. 1 according to an embodiment of the invention.

FIG. 5B is a flowchart illustrating implementation of the step (i.e. the step S130) of obtaining the distance statistic values corresponding to the modulation types by counting the signal distances in FIG. 1 according to an embodiment of the invention. The step S130 of FIG. 5B includes sub steps S131, S132, S133 and S134. Referring to FIG. 5A and FIG. 5B, implementation of the statistics device 431 is described below, and the other statistics devices in the statistics unit 430 are the same to the statistics device 431. The statistics device 431 includes a subtractor 510, a value generating unit 520, a second multiplication unit 530 and an accumulator 540. The subtractor 510 subtracts the output of the first multiplication unit 410 from the nearest point $d_{k_0}^0$ (the step S131), i.e. the signal distance $S_0(n)=d_{k_0}^0-y(n)$ is calculated. According to FIG. 3B, it is obvious that a space between the neighbouring points $d_1^0$ and $d_2^0$ is different to a space between the neighbouring points $d_2^0$ and $d_3^0$. Therefore, in the present embodiment the signal distance $S_0(n)$ output from the subtractor 510 is normalized. Namely, the value generating unit 520 provides a point space $(d_{k_0}^0-d_{k_0-1}^0)$ or $(d_{k_0+1}^0-d_{k_0}^0)$ between the nearest point $d_{k_0}^0$ and the neighbouring point to the second multiplication unit 530 (the step S132), and then the second multiplication unit 530 divides the signal distance $S_0(n)$ by the point space (the step S133).

In the present embodiment, the value generating unit 520 determines the point space between the nearest point $d_{k_0}^0$ and the neighbouring point $(d_{k_0-1}^0$ or $d_{k_0+1}^0)$ according to the output $S_0(n)$ of the subtractor 510, and outputs a reciprocal of the point space, i.e. $1/(d_{k_0}^0-d_{k_0-1}^0)$ or $1/(d_{k_0+1}^0-d_{k_0}^0)$. The reciprocals of the point spaces $1/(d_{k_0}^0-d_{k_0-1}^0)$ and $1/(d_{k_0+1}^0-d_{k_0}^0)$ can be calculated in advance to establish a look-up table, so as to reduce a calculation complexity. The input signal y(n) is located between the nearest point and the neighbouring point, so that the value generating unit 520 determines whether the nearest point is $d_{k_0-1}^0$ or $d_{k_0+1}^0$ according to the signal distance $S_0(n)$. If $S_0(n) \geq 0$, it represents that the input signal y(n) is located between the point $d_{k_0-1}^0$ and the point $d_{k_0}^0$, so that the value generating unit 520 outputs $1/(d_{k_0}^0-d_{k_0-1}^0)$ to the second multiplication unit 530. If $S_0(n)<0$, it represents that the input signal y(n) is located between the point $d_{k_0+1}^0$ and the point $d_{k_0}^0$, so that the value generating unit 520 outputs $1/(d_{k_0+1}^0-d_{k_0}^0)$ to the second multiplication unit 530. The second multiplication unit 530 multiplies the reciprocal of the point space by the output $S_0(n)$ of the subtractor 510 and outputs the product thereof to the accumulator 540. Taking FIG. 3B as an example, the subtractor 510 subtracts the input signal y(n) from the nearest point $d_2^0$ output from the 16QAM demapper 421, so as to output the signal distance $S_0(n)$. The value generating unit 520 determines whether the nearest point is $d_2^0$ or $d_3^0$ according to the signal distance $S_0(n)$. Here, the value generating unit 520 selects to output $1/(d_2^0-d_1^0)$ to the second multiplication unit 530. The second multiplication unit 530 outputs a normalized signal distance $S_0(n)/(d_2^0-d_1^0)$ to the accumulator 540.

Next, the step S134 is executed, the accumulator 540 eliminates a positive/negative symbol of the output of the second multiplication unit 530. A method for eliminating the positive/negative symbol is to obtain an absolute value of the output of the second multiplication unit 530. In the present embodiment, the output of the second multiplication unit 530 is squared to eliminate the positive/negative symbol thereof. Then, N square values are accumulated to obtain the distance statistics value $L_0$. Thereafter, the accumulator 540 outputs the distance statistics value $L_0$ to the decision unit 440. The decision unit 440 executes the step S140 to compare the distance statistics values $L_0$-$L_i$ to select a minimum one, so as to recognize the applied modulation type.

Figure 6:
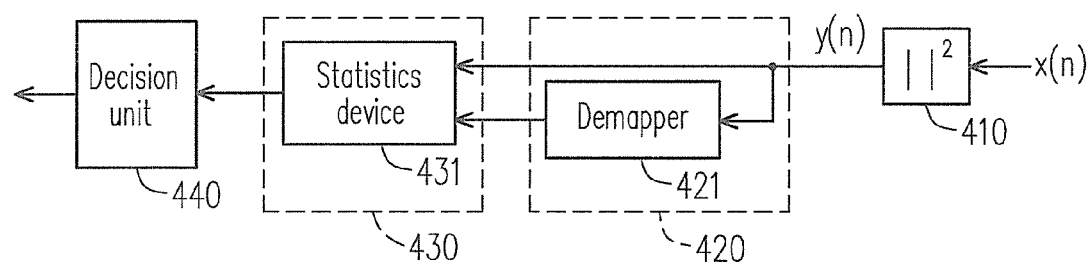
FIG. 6 is a diagram illustrating another example of a modulation recognition apparatus of FIG. 4 according to an embodiment of the invention.

The above embodiments can be suitably modified by those skilled in the art according to an actual design requirement. For example, FIG. 6 is a diagram illustrating another example of the modulation recognition apparatus 400 of FIG. 4 according to an embodiment of the invention. In the modulation recognition apparatus 400 of FIG. 4, different channels are used to individually accumulate the distance statistics values $L_0$-$L_i$. A difference between FIG. 6 and FIG. 4 is that in the modulation recognition apparatus of FIG. 6, a same channel is shared to accumulate the distance statistics values $L_0$-$L_i$ of different constellations. A detailed implementation of the modulation recognition apparatus of FIG. 6 can be deduced according to that of the modulation recognition apparatus 400 of FIG. 4, and therefore detailed description thereof is not repeated.

In summary, in the aforementioned embodiments, the modulation type is recognized according to different constellation point characteristics of different modulation types. The nearest points located nearest to the position of the input signal x(n) in the constellations corresponding to various modulation types are respectively de-mapped, and distances (differences) between the nearest points and the position of the input signal x(n) in the constellations are respectively counted. The modulation recognition apparatus 400 respectively counts distances between the nearest points and the position of the input signal in the constellations to obtain a plurality of distance statistics values corresponding to the modulation types. By comparing the distance statistics values, the modulation recognition apparatus 400 can quickly and correctly recognize the modulation type of the input signal. Therefore, the modulation recognition apparatus 400 can recognize the modulation type of the input signal without requiring a transmitting end to provide any priority information. The modulation recognition method of the invention is not influenced by carrier and phase offset, and has advantages of low complexity and high convergence rate. In a noisy environment, the modulation recognition method and the apparatus 400 of the invention still have a good performance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A modulation recognition apparatus in a communication system, comprising:
    a first multiplication unit, for multiplying an absolute value of an input signal by the absolute value of the input signal;
    a de-mapping unit, coupled to the first multiplication unit, for respectively finding out a nearest point located nearest to a position of the input signal in a plurality of constellations according to an output of the first multiplication unit, wherein the constellations correspond to a plurality of modulation types;
    a statistics unit, coupled to the de-mapping unit, for respectively counting a signal distance between the nearest point and the position of the input signal in each of the constellations, so as to obtain a plurality of distance statistics values corresponding to the modulation types, wherein the statistics unit comprises a plurality of statistics devices, wherein each of the statistics devices counts the signal distance between the nearest point and the position of the input signal of a corresponding constellation, so as to obtain the distance statistics value of the corresponding constellation, wherein the statistics device comprises:
        a subtractor, for subtracting the output of the first multiplication unit from the nearest point;
        a value generating unit, for determining a point space between the nearest point and a neighbouring point according to an output of the subtractor, and outputting a reciprocal of the point space, wherein the output of the first multiplication unit is located between the nearest point and the neighbouring point;
        a second multiplication unit, for multiplying the reciprocal of the point space with the output of the subtractor; and
        an accumulator, for eliminating a positive/negative symbol of an output of the second multiplication unit, and accumulating the output of the second multiplication unit having the positive/negative symbol eliminated, so as to obtain one of the distance statistics values; and
    a decision unit, coupled to the statistics unit, for comparing the distance statistics values to recognize a modulation type of the input signal.

2. The modulation recognition apparatus in the communication system as claimed in claim 1, wherein the de-mapping unit comprises:
    a plurality of demappers, wherein each of the demappers generates a hard decision of an output of the first multiplication unit for the statistics unit according to a decision boundary corresponding to a modulation type.

3. The modulation recognition apparatus in the communication system as claimed in claim 1, wherein the decision unit obtains a minimum value from the distance statistics values, and recognizes the modulation type of the input signal according to the constellation corresponding to the minimum value.

* * * * *